United States Patent
Shibusawa

(10) Patent No.: US 8,400,691 B2
(45) Date of Patent: Mar. 19, 2013

(54) IMAGE FORMING APPARATUS GENERATING COLOR IMAGE DATA WITH VARYING EMPHASIS

(75) Inventor: Toshihiko Shibusawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 842 days.

(21) Appl. No.: 12/567,811

(22) Filed: Sep. 28, 2009

(65) Prior Publication Data

US 2010/0245863 A1 Sep. 30, 2010

(30) Foreign Application Priority Data

Mar. 25, 2009 (JP) ................................. 2009-075180

(51) Int. Cl.
*H04N 1/46* (2006.01)
(52) U.S. Cl. ......... 358/500; 358/1.9; 382/167; 382/298; 382/176
(58) Field of Classification Search .................. 358/1.9, 358/500–540; 382/167, 176, 298
See application file for complete search history.

(56) References Cited

U.S. PATENT DOCUMENTS

| 6,169,607 B1 * | 1/2001 | Harrington | 358/1.9 |
| 2004/0027594 A1 * | 2/2004 | Suzuki et al. | 358/1.2 |

FOREIGN PATENT DOCUMENTS

| JP | 2004-078325 A | 3/2004 |
| JP | 2004-080118 A | 3/2004 |

* cited by examiner

*Primary Examiner* — Benny Q Tieu
*Assistant Examiner* — Michael Y Tzeng
(74) *Attorney, Agent, or Firm* — Sughrue Mion, PLLC

(57) ABSTRACT

An image-processing apparatus includes: a memory that stores a red color range occurring within a color space; an acquiring unit that acquires image data representing an image containing text; and a generating unit that generates, based on the image data acquired by the acquiring unit, image data in which a pattern image is disposed in a region containing text whose color is within the red color range, the pattern image having a first transmittance in a case that a size of the region is greater than or equal to a threshold, the pattern image having a second transmittance that is smaller than the first transmittance in a case that the size of the region is smaller than the threshold.

11 Claims, 6 Drawing Sheets

IMAGE FORMING APPARATUS GENERATING COLOR IMAGE DATA WITH VARYING EMPHASIS

CROSS-REFERENCE TO RELATED APPLICATIONS

This application is based on and claims priority under 35 USC 119 from Japanese Patent Application No. 2009-75180 filed Mar. 25, 2009.

BACKGROUND

1. Technical Field

The present invention relates to an image-processing apparatus, an image-forming apparatus, and an image-processing method.

2. Related Art

There are cases where the ways in which people see color differ due to differences in gene types, visual disorders, and so on. A condition where a person has difficulty distinguishing a specific color range is referred to as color blindness.

SUMMARY

According to an aspect of the invention, there is provided an image-processing apparatus including: a memory that stores a red color range occurring within a color space; an acquiring unit that acquires image data representing an image containing text; and a generating unit that generates, based on the image data acquired by the acquiring unit, image data in which a pattern image is disposed in a region containing text whose color is within the red color range, the pattern image having a first transmittance in a case that a size of the region is greater than or equal to a threshold, the pattern image having a second transmittance that is smaller than the first transmittance in a case that the size of the region is smaller than the threshold.

BRIEF DESCRIPTION OF THE DRAWINGS

Exemplary embodiment of the present invention will be described in detail based on the following figures, wherein.

DETAILED DESCRIPTION

The retinas of the eyes of a typical individual with normal color vision contain three types of cones, or red, green, and blue cones, whose sensations (spectral sensitivities) differ depending on the wavelength of light. However, color-blind individuals have differences in cones and in spectral sensitivities as compared to those individuals who have normal color vision, and thus have less information with which to distinguish between hues such as red, yellow, and blue. Color-blind individuals can therefore distinguish colors based only on differences in saturation and brightness. Meanwhile, there are several different types of color blindness; for example, there are cases where red hues cannot be recognized, making it difficult to distinguish between red and achromatic colors such as black. Red is often used in materials that present information, such as documents, to highlight content that is important, content to be emphasized, content that is to elicit the attention of a user, and so on. It follows that if a user cannot distinguish between red and other colors, the user is likely to experience problems when viewing a document or the like. Hereinafter, an exemplary embodiment of the present invention shall be described with reference to a document that has been modified with red, as an example. Note that the following descriptions assume the use of the RGB color space, which is one type of an additive color mixture that reproduces a wide range of colors by mixing three base colors, or red, green, and blue, where each of those base colors is expressed as 8 bits (256 tones); "red," meanwhile, refers to colors expressed within an (R, G, B) range of (220-225, 0-55, 0-55). Furthermore, in the present exemplary embodiment, an expression such as "A-B," referring to a range from A to B, is defined as "greater than or equal to A and smaller than or equal to B".

(Configuration)

Figure 1:
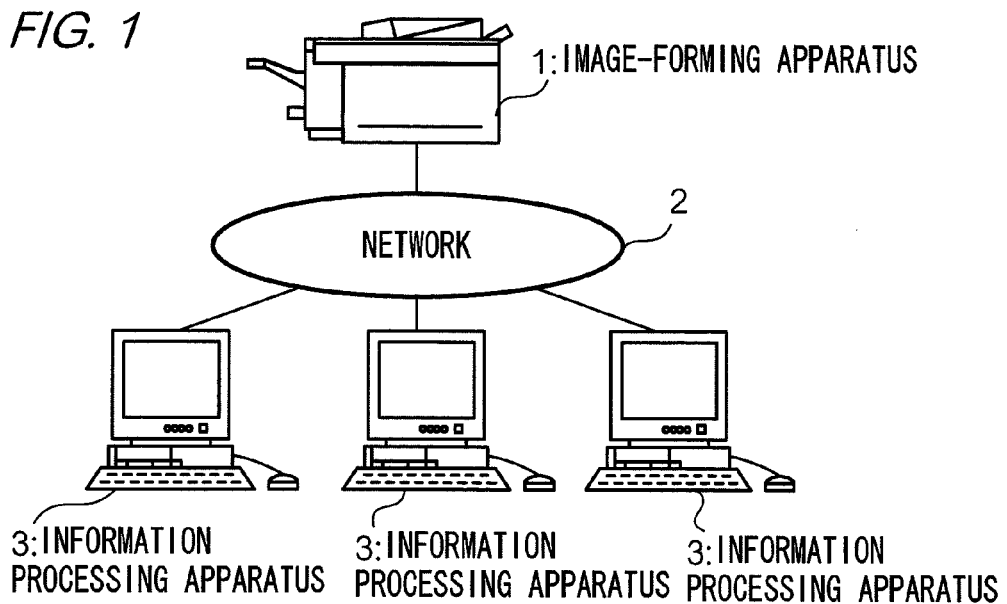
FIG. 1 is a diagram showing the overall configuration of a system according to an exemplary embodiment of the present invention.

FIG. 1 is a diagram showing the overall configuration of a system according to the present exemplary embodiment.

An image-forming apparatus 1 and an information processing apparatus 3 are connected via a network 2, which is a communications network for transmitting information, such as a WAN (Wide Area Network) or a LAN (Local Area Network). The image-forming apparatus 1 is a device that consolidates functions such as copying, printing, and scanning into a single device, and forms images on a recording medium, reads images from the recording medium, and so on. The information processing apparatus 3 is, for example, a personal computer, and performs various types of image processes, supplies image data to the image-forming apparatus 1 via the network 2 and instructs the image-forming apparatus 1 to form images based on that image data, and so on. Although FIG. 1 shows a single image-forming apparatus 1 and three information processing apparatuses 3, it should be noted that the numbers of image-forming apparatuses 1 and information processing apparatuses 3 connected to the network 2 are not limited thereto.

Figure 2:
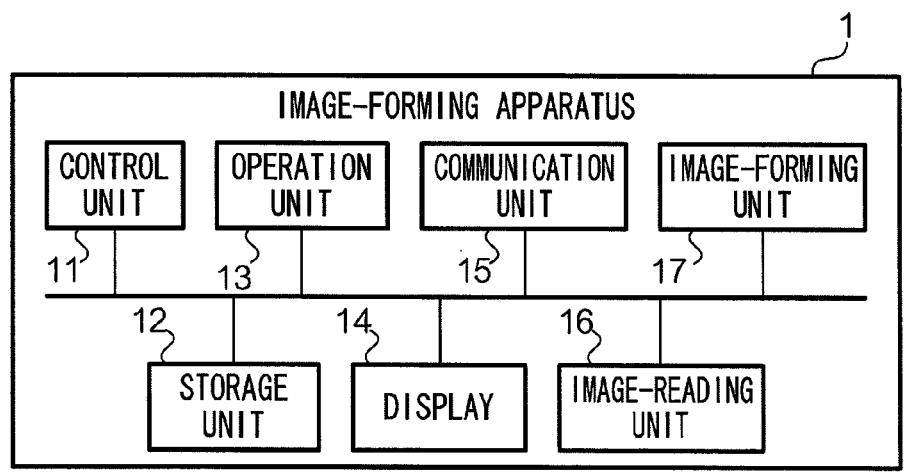
FIG. 2 is a block diagram showing the configuration of an image-forming apparatus 1 according to the same exemplary embodiment.

FIG. 2 is a block diagram showing a configuration of the image-forming apparatus 1.

The image-forming apparatus 1 includes a control unit 11, a storage unit 12, an operation unit 13, a display 14, a communication unit 15, an image-reading unit 16, and an image-forming unit 17. The control unit 11 includes a CPU (Central Processing Unit), a ROM (Read Only Memory), and a RAM (Random Access Memory), and controls the various units of the image-forming apparatus 1 by execution by its CPU of programs stored in the ROM, the storage unit 12, and so on. The storage unit 12 is a non-volatile supplementary storage device such as a HD (Hard Disk), in which are stored various programs, data, and so on. The operation unit 13 includes multiple keys, accepts operations performed by a user, and supplies signals based on the operations to the control unit 11. The display 14 includes a VRAM (Video RAM), a liquid-crystal display, and a liquid-crystal driving circuit, and displays the progress of processing based on information supplied by the control unit 11, information for guiding the operations performed by the user, and so on. The communication unit 15 includes a communication circuit and a communication interface, and communicates with the information processing apparatus 3 via the network 2. The image-reading unit 16 includes an optical system member configured of a CCD (Charge Coupled Device), and reads an image formed on a recording medium using the optical system member, thereby generating image data representing the read image. The image forming unit 17 includes a photosensitive drum serving as an image carrier, an exposure unit that forms an electrostatic latent image, a developing unit that develops the electrostatic latent image and forms a toner image, a transfer unit that transfers the toner image to a recording medium, and a fixing unit that fixes the toner image transferred to the recording medium onto that recording medium. The image forming unit 17 is an example of an image forming unit that forms an image on a recording medium based on image data generated by the image reading unit 16, image data received via the communication unit 15, and so on.

Figure 3:
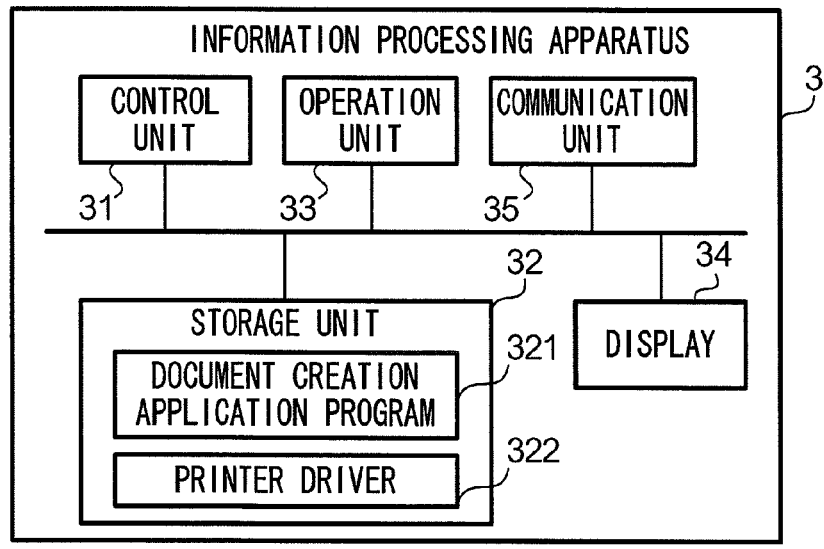
FIG. 3 is a block diagram showing the configuration of an information processing apparatus 3 according to the same exemplary embodiment.

FIG. 3 is a block diagram showing the configuration of the information processing apparatus 3.

The information processing apparatus 3 includes a control unit 31, a storage unit 32, an operation unit 33, a display 34, and a communication unit 35. The control unit 31 includes a CPU (Central Processing Unit), a ROM (Read Only Memory), and a RAM (Random Access Memory), and controls the various units of the information processing apparatus 3 by execution by its CPU of programs stored in the ROM, the storage unit 32, and so on. The operation unit 33 includes an operating device, such as a keyboard, a mouse, or the like, that accepts operations from a user and supplies signals based on those operations to the control unit 31. The display 34 includes a display device such as a CRT display, a liquid-crystal display, or the like, and displays a variety of information based on image data supplied by the control unit 31. The communication unit 35 includes a communication circuit and a communication interface, and communicates with the image-forming apparatus 1 via the network 2.

The storage unit 32 is a non-volatile supplementary storage device such as an HD (Hard Disk), in which are stored various programs, data, and so on. The programs stored in the storage unit 32 include a document creation application program 321 in which are denoted procedures for creating, editing, and saving document image data representing a document that expresses text, diagrams, tables, or the like in multiple colors, and a printer driver 322 in which are denoted processing procedures for converting the document image data into image data expressed as page description language that can be processed by the image-forming apparatus 1. The aforementioned red color range occurring in the RGB color space, where (R, G, B)=(220-255, 0-55, 0-55), is denoted in the printer driver 322. In other words, the storage unit 32 in which the printer driver 322 is stored is an example of a memory that stores a red color range. Furthermore, a procedure for processing that allows color-blind individuals to recognize parts of document image data, created by a user executing the document creation application program 321, that have been highlighted in red for the purpose of emphasis or the like, as being emphasized (called "emphasis support processing" hereinafter) is denoted in the printer driver 322. This emphasis support processing modifies characters in the document image data that are written in red, thereby making it easy to distinguish reds used for emphasis from other colors (typically, black, which is generally the most commonly used color in documents). Such modification is called "shade" hereinafter. To be more specific, shade is a process whereby multiple images made up of halftone dots (called "halftone-dot images" hereinafter) are disposed, with predetermined spaces left therebetween, in regions containing character strings made up of red text.

(Operations)

A user causes the information processing apparatus 3 to execute the document creation application program 321, and creates a document by operating the operation unit 33 while referring to the display 34. At this time, the user can operate the operation unit 33 to instruct the information processing apparatus 3 to make the color of the text red in parts of the document s/he wishes to emphasize. The control unit 31 creates document image data representing the document in a memory, such as the RAM, based on operations performed by the user, in accordance with procedures denoted in the document creation application program 321. The control unit 31 is thus an example of an acquiring unit that acquires document image data by creating and storing document image data in this manner. Then, when the user instructs that the created document is to be printed out by operating the operation unit 33, the control unit 31 executes the printer driver 322, thereby commencing the processing shown in FIG. 4.

Figure 4:
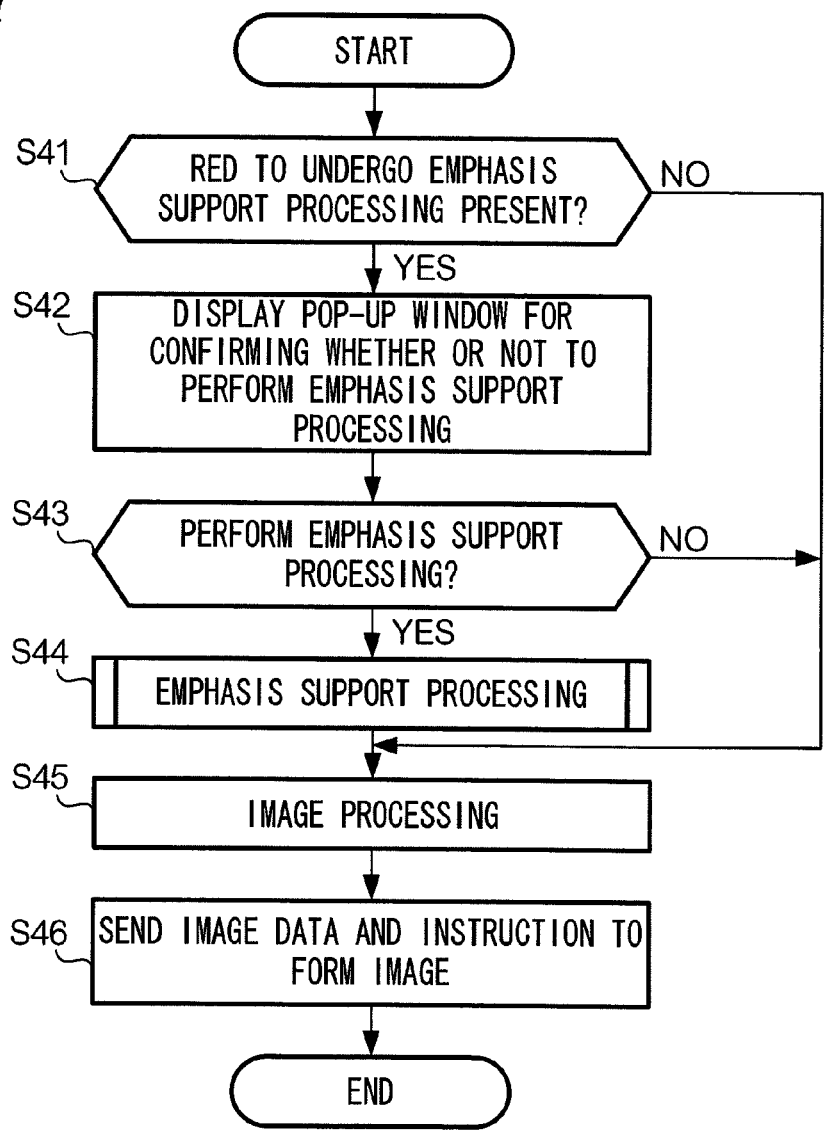
FIG. 4 is a flowchart showing operations performed when the information processing apparatus 3 executes a printer driver, according to the same exemplary embodiment.

In FIG. 4, the control unit 31 first analyzes the document image data and determines whether red that is to undergo emphasis support processing is present (step S41). The document image data contains color information representing various colors for representing text, diagrams, or tables as images. The control unit 31 can identify parts of the document image data that are to undergo emphasis support processing by comparing that color information with the red color range denoted in the printer driver 322. If it has been determined that red is present (step S41; YES), the control unit 31 displays a pop-up window 5, for the user to confirm whether to execute the emphasis support processing, in the display 34 (step S42).

Figure 5:
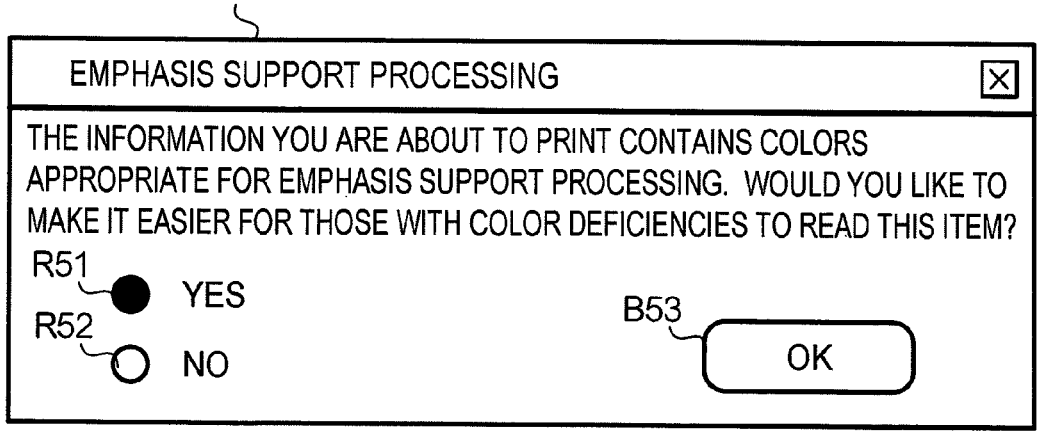
FIG. 5 is a diagram showing a pop-up window 5 for confirming whether to execute emphasis support processing according to the same exemplary embodiment.

FIG. 5 is a diagram showing the pop-up window 5.

The pop-up window 5 includes radio buttons R51 and R52 serving as alternatives through which whether to carry out the emphasis support processing can be selected. By selecting either the radio button R51 or the radio button R52, the user can select whether to carry out the emphasis support processing. Here, it is assumed that the user has operated the operation unit 33 to select the radio button R51, "yes," as shown in FIG. 5, and furthermore selecting a button B53, "OK," located in the right-hand corner of the window (step S43; YES). Upon performance of this operation, the control unit 31 performs, as the emphasis support processing, a process for generating document image data to which shade has been applied in a region containing a character string composed of characters written in red (step S44).

Figure 6:
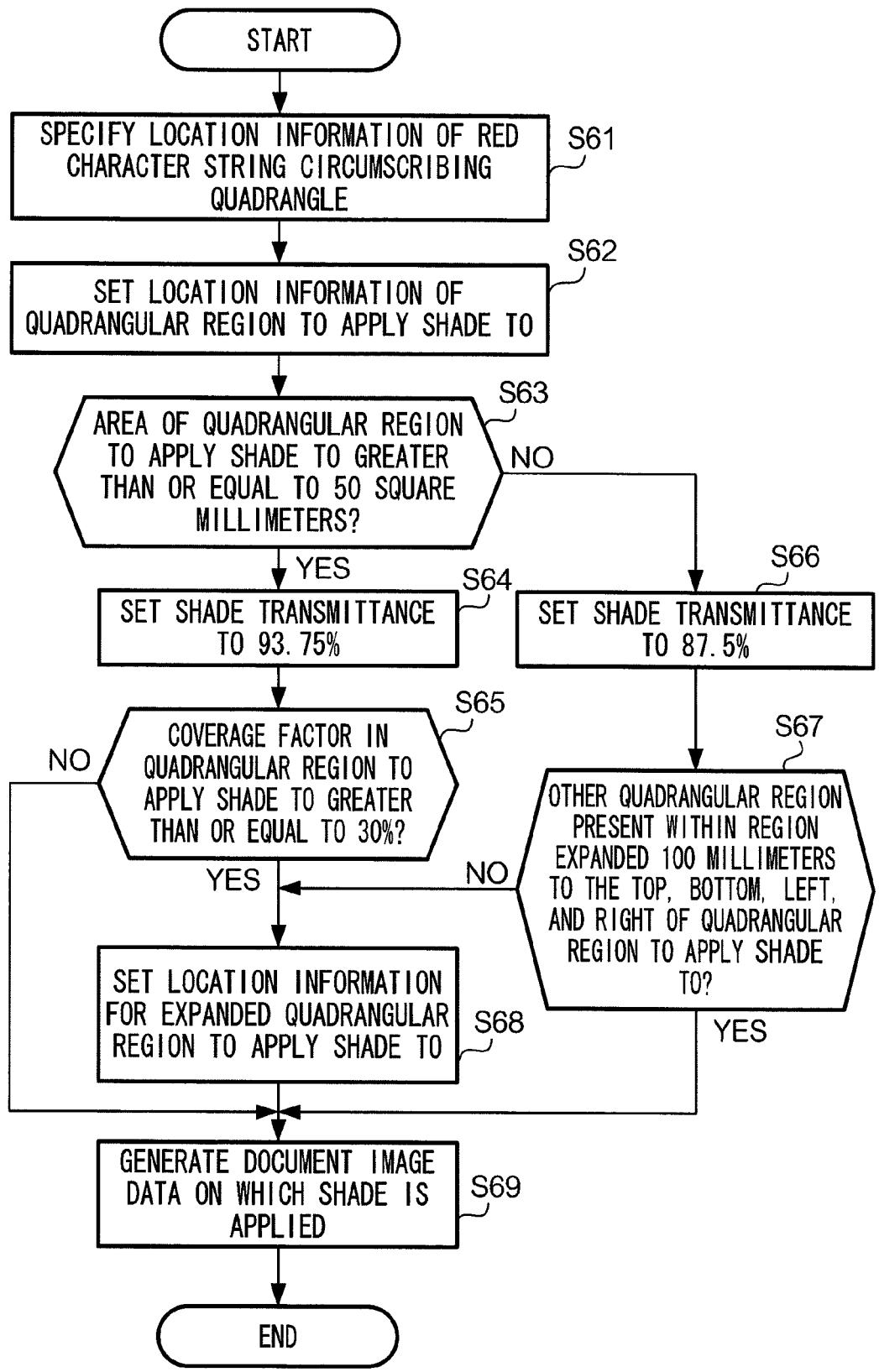
FIG. 6 is a flowchart showing emphasis support processing according to the same exemplary embodiment.

FIG. 6 is a flowchart showing the emphasis support processing.

The control unit 31 extracts a character string made up of characters written in red by comparing the color information contained in the document image data with the red color range denoted in the printer driver 322, and furthermore specifies location information of a quadrangular region circumscribing that character string (called a "red character string circumscribing quadrangle" hereinafter) (step S61). The control unit 31 then performs a setting process for storing the location information representing the location of the specified red character string circumscribing quadrangle in the RAM of the control unit 31, as location information of the quadrangular region to which shade is applied (step S62).

Next, the control unit 31 sets the transmittance of the shade to be applied to the quadrangular region, based on the area of the red character string-circumscribing quadrangle. The "transmittance" of the shade refers to the percentage of the area, within a certain unit of area that is not occupied by halftone-dot images.

Figure 7:
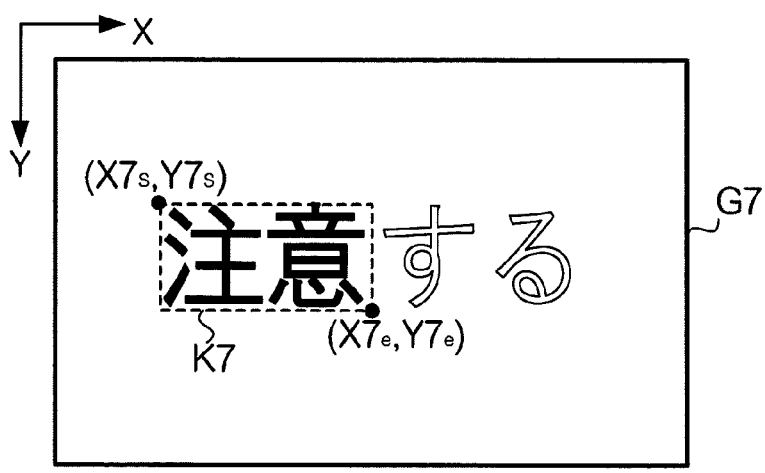
FIG. 7 is a diagram showing document image data according to the same exemplary embodiment.

FIG. 7 shows an example of a red character string-circumscribing quadrangle specified in a document image expressed by document image data. In the document image in FIG. 7, text written in black is expressed using bubble characters, whereas text written in red is expressed using black characters. It is assumed that the Y direction represents the sub scanning direction and the X direction represents the main scanning direction; thus the location information of the pixels contained in the document image data is expressed through an XY coordinate system. The location information of the quadrangular region is expressed by the location information of the pixels that have the minimum X and Y values within that quadrangular region (called "origin coordinates" hereinafter) and the location information of the pixels that have the maximum X and Y values within that quadrangular region (called "end coordinates" hereinafter). A quadrangular region K7 in an image expressed by document image data G7 is a red character string circumscribing quadrangle, whose origin coordinates are ($X7s,Y7s$) and end coordinates are ($X7e, Y7e$). The control unit 31 calculates the area S of that quadrangular region based on the location information of the specified red character string-circumscribing quadrangle. The area S is calculated using the formula ($X7e-X7s$)×($Y7s-Y7e$).

The control unit 31 then determines whether the calculated area S is greater than or equal to, or smaller than, a predetermined threshold of 50 square millimeters (step S63), and determines the transmittance of the shade based on the result of that determination. To be more specific, if the area S of the red character string circumscribing quadrangle is greater than or equal to 50 square millimeters, which is an example of a first threshold (step S63;YES), the control unit 31 performs a setting process for storing a shade transmittance of 93.75% in the RAM (step S64). As mentioned earlier, the "transmittance" of the shade is the percentage of the area, within a certain unit of area that is not occupied by halftone-dot images; thus a shade transmittance of 93.75% means that the percentage of the area, within the certain unit of area that is occupied by halftone-dot images, is 6.25%. This 6.25% is an example of a first percentage. However, if the area S of the red character string-circumscribing quadrangle is smaller than 50 square millimeters (step S63; NO), the control unit 31 performs a setting process for storing a shade transmittance of 87.5%, which is an example of a second transmittance smaller than the first transmittance, in the RAM (step S66). A shade transmittance of 87.5% means that the percentage of the area, within the certain unit of area that is occupied by halftone-dot images is 12.5%. This 12.5% is an example of a second percentage that is greater than the first percentage.

Figure 8:
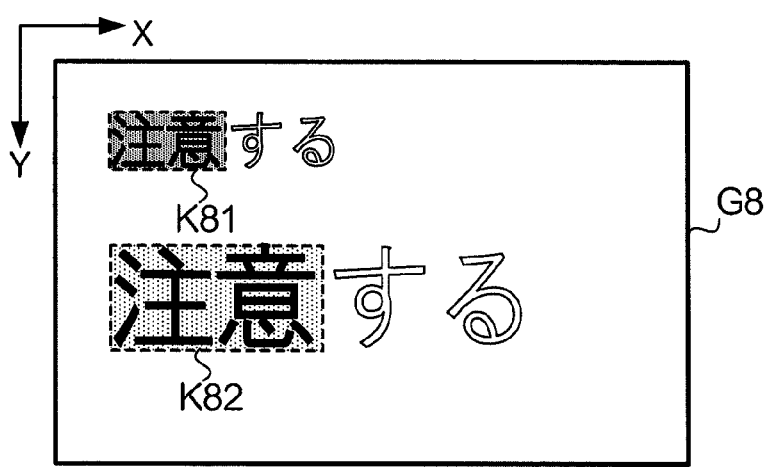
FIG. 8 is a diagram showing document image data according to the same exemplary embodiment.

FIG. 8 is a diagram showing shade applied to red character string circumscribing quadrangles.

A quadrangular region K81 in an image expressed by document image data G8 is determined by the control unit 31 to have an area S of smaller than 50 square millimeters, (step S63; NO in FIG. 6), and thus shade with a transmittance of 87.5% is applied thereto. Meanwhile, a quadrangular region K82 is determined by the control unit 31 to have an area S greater than or equal to 50 square millimeters (step S63; YES), and thus shade with a transmittance of 93.75% is applied thereto.

Even a color-blind individual, who has difficulty distinguishing red hues, can easily distinguish regions on which shade has been applied from other background regions based on the difference in brightness therebetween. Therefore, applying shade to characters written in red makes it easier to distinguish the characters written in red from characters written in other colors. Furthermore, if there is a small number of characters contained in the character string written in red, the size of the characters is small, and so on, the area of the red character string-circumscribing quadrangle sometimes becomes less than 50 square millimeters. In this case, even if shade is applied to the red character string circumscribing quadrangle, the area to which the shade is applied is comparatively small relative to the area of the overall document image, and thus may not stand out, resulting in poor emphasis effects for the user. Accordingly, as described above, when the area of the red character string-circumscribing quadrangle is less than a threshold, the transmittance of the shade is reduced, thereby increasing the density of the shade. As a result, the difference in brightness between the red character string-circumscribing quadrangle region and other background regions becomes greater than it was prior to the stated increase in density. It is thus easy to distinguish between the red character string-circumscribing quadrangle region and other regions based on this increased difference in brightness, particularly if the user is color blind. On the other hand, if the area of the red character string-circumscribing quadrangle is greater than or equal to 50 square millimeters, the transmittance is increased, thereby reducing the density of the shade. This is done for several reasons; first, if the density of the shade is too great, the edge portions of the red characters (the border between each character and the background) overlap with the shade and become unclear, making the characters less legible, and second, reducing the density of the shade contributes to toner conservation.

The descriptions shall now return to FIG. 6. Once the control unit 31 has set the shade transmittance, the procedure moves to a process for determining whether or not to enlarge the quadrangular region on which shade is applied.

First, in step S64, once the shade transmittance has been set to 93.75%, the control unit 31 compares the color information of the pixels contained in the red character string circumscribing quadrangle with the red color range denoted in the printer driver 322, and calculates the coverage factor of the red characters. The "coverage factor" of the red characters refers to the percentage of the area of the red character string-circumscribing quadrangle that is occupied by pixel groups that compose red characters. The control unit 31 then determines whether the coverage factor is greater than or equal to, or smaller than, 30%, which is an example of a second threshold (step S65), and further determines, based upon the result of that determination, whether to expand the quadrangular region on which to apply shade. To be more specific, if the coverage factor is greater than or equal to 30% (step S65; YES), the control unit 31 expands the size of the red character string-circumscribing quadrangle (step S68). However, if the result of the determination indicates that the coverage factor is smaller than 30% (step S65; NO), the process for expanding the red character string-circumscribing quadrangle is not carried out.

Figure 9:
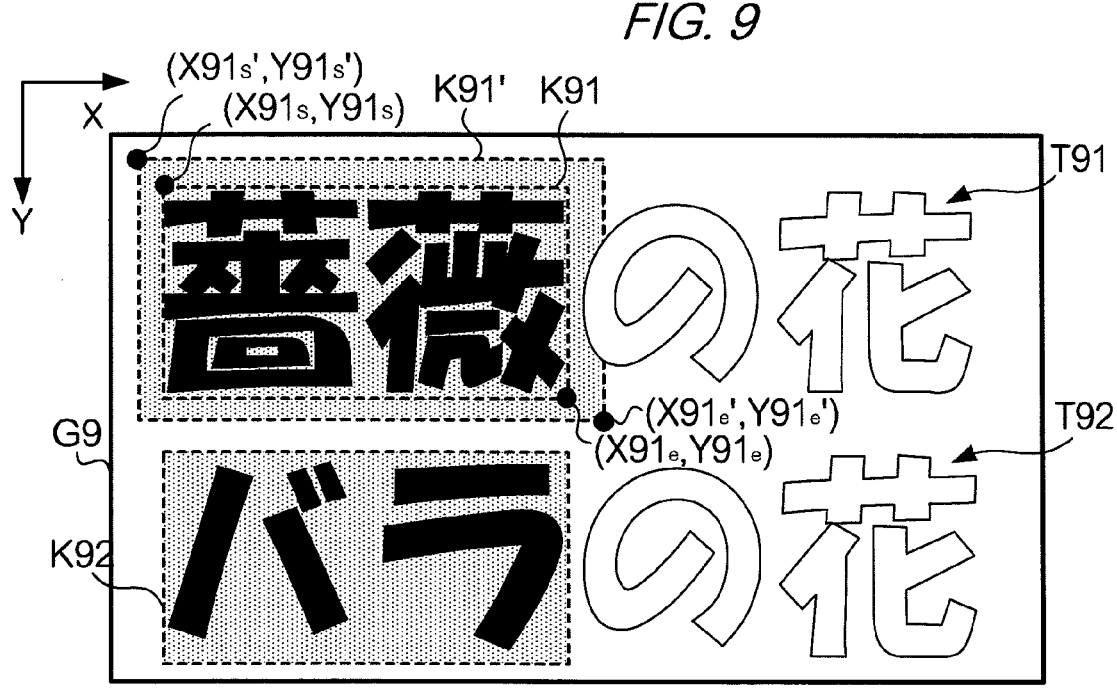
FIG. 9 is a diagram showing document image data according to the same exemplary embodiment.

FIG. 9 is a diagram showing shade carried out on red character string-circumscribing quadrangles.

A character string T91 and a character string T92 are written in an image expressed by document image data G9. In the image in FIG. 9, text written in black is expressed using bubble characters, whereas text written in red is expressed using black characters. The character string T91 contains a red character string that has many pixels, where the area occupied by the characters is a large percentage of the area of the circumscribing quadrangle. However, the character string T92 contains a red character string that has few pixels, where the area occupied by the characters is a small percentage of the circumscribing quadrangle. Here, the coverage factor of the red characters in the character string T91 is greater than or equal to 30%, whereas the coverage factor of the red characters in the character string T92 is smaller than 30%. Upon determining that the coverage factor calculated for a quadrangular region K91, which is the red character string-circumscribing quadrangle for the character string T91, is greater than or equal to 30% (step S65; YES in FIG. 6), the control unit 31 executes the process for expanding the size of the quadrangular region K91 (step S68). More specifically, the control unit 31 performs a setting process for storing, in the RAM, a quadrangular region K91' acquired by expanding the quadrangular region K91 1 millimeter each in the main scanning direction, the sub scanning direction, the direction opposite to the main scanning direction, and the direction opposite to the sub scanning direction, as the quadrangular region to which shade is applied. For example, assuming that the location information of the quadrangular region K91 has origin coordinates of (X91$s$, Y91$s$) and end coordinates of (X91$e$, Y91$e$), and the location information of the expanded quadrangular region K91' has origin coordinates of (X91$s$', Y91$s$') and end coordinates of (X91$e$', Y91$e$'), the relationship between the respective coordinates is as indicated below.

(X91$s$',Y91$s$')=(X91$s$−1 millimeter,Y91$s$−1 millimeter)

(X91$e$',Y91$e$')=(X91$e$+1 millimeter,Y91$e$+1 millimeter)

On the other hand, upon determining that the coverage factor in the quadrangular region K92, in which the red characters in the character string T92 is written, is smaller than the 30% threshold (step S65; NO), the control unit 31 does not execute the process for expanding the size of the quadrangular region K92. In other words, the location information of the quadrangular region to which the shade is applied remains the same as that stored in the RAM in step S62.

If shade is applied to the red character string-circumscribing quadrangle when the coverage factor of red characters is greater than or equal to the 30% due to reasons such as a higher number of strokes in a single character, areas in which the edge portions of the red characters overlap with the shade increase, which may cause the characters to be difficult to read, leading to a drop in the effectiveness of the emphasis. Accordingly, the size of the shade quadrangular region is expanded when the coverage factor of the red characters is greater than or equal to a threshold, as described above. This increases the area to which the shade is applied relative to the area of the overall document image to a greater extent than before the expansion, making the emphasis more apparent. This makes it easier for a color-blind individual to recognize the presence of characters written in red and characters written in other colors than when there is no change in the quadrangular region to which shade is applied.

The descriptions shall now return once again to FIG. 6. Upon setting the shade transmittance to 87.5% in step S66, the control unit 31 determines whether another red character string-circumscribing quadrangle is present within a predetermined distance from the location of the initial red character string-circumscribing quadrangle (step S67). This "predetermined distance" is, for example, 100 millimeters, and is an example of a third threshold. If the result of the determination indicates that another red character string-circumscribing quadrangle is not present within the range of 100 millimeters (step S67; NO), the control unit 31 expands the size of the red character string-circumscribing quadrangle (step S68). However, if the result of the determination indicates that another red character string-circumscribing quadrangle is present within the range of 100 millimeters (step S67; YES), the control unit 31 does not perform the process for expanding the size of the red character string-circumscribing quadrangle. In other words, when multiple red character string-circumscribing quadrangles are present, the control unit 31 expands the area of circumscribing quadrangles whose distance from another quadrangle exceeds a threshold.

Figure 10:
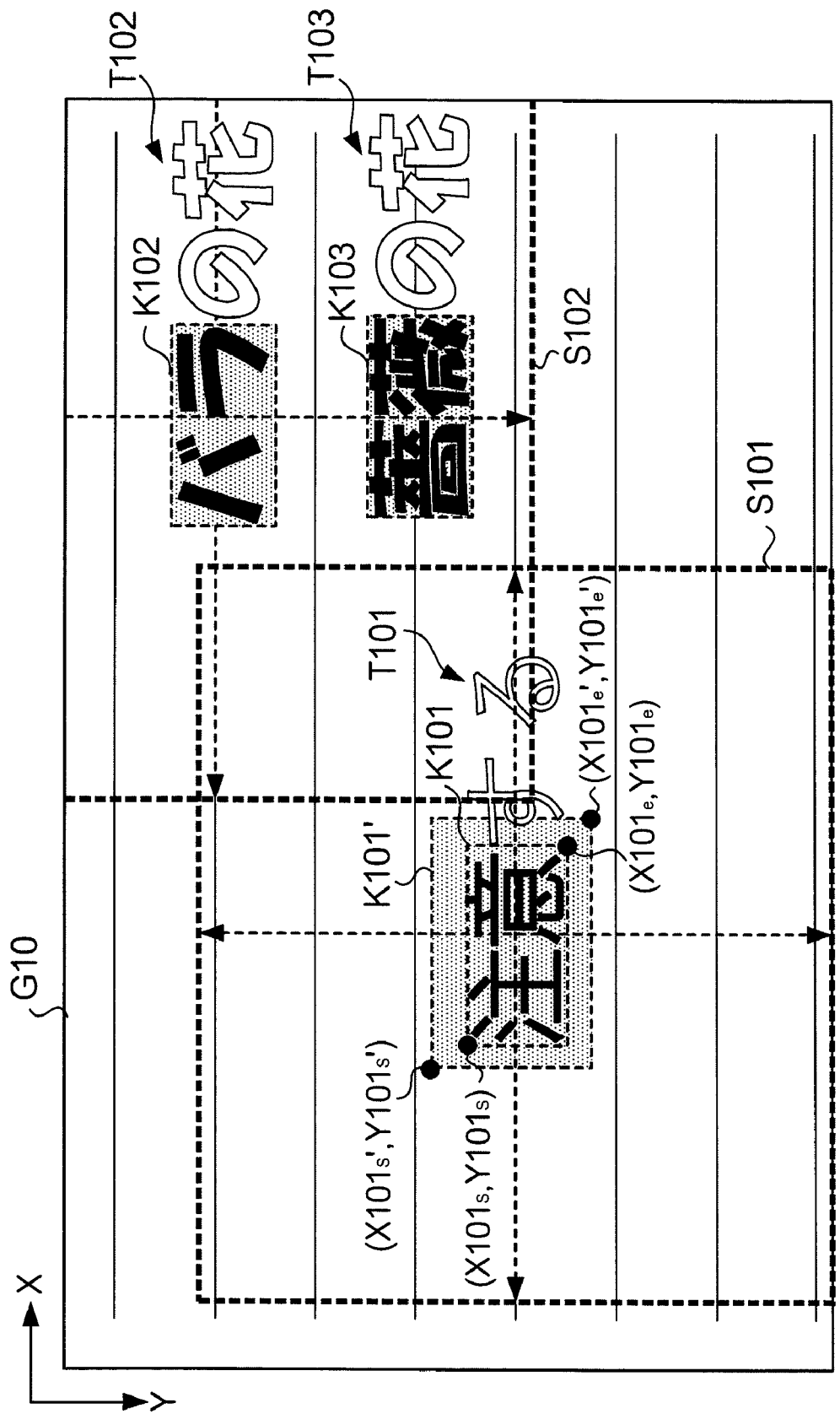
FIG. 10 is a diagram showing document image data according to the same exemplary embodiment.

FIG. 10 is a diagram showing shade carried out on red character string-circumscribing quadrangles.

A character string T101, a character string T102, and a character string T103 are written in document image data G10. For the purposes of these descriptions, in the image shown in FIG. 10, text written in black is expressed using bubble characters, whereas text written in red is expressed using black characters. Focusing first on a quadrangular region K101, which corresponds to the red character string-circumscribing quadrangle for the character string T101, the control unit 31 scans within and including the boundary lines of a scanning quadrangular region S101 acquired by expanding the quadrangular region K101 100 millimeters each in the main scanning direction, the sub scanning direction, the direction opposite to the main scanning direction, and the direction opposite to the sub scanning direction, and determines whether another red character string-circumscribing quadrangle is present therein (step S67 in FIG. 6). Here, as shown in FIG. 10, another red character string-circumscribing quadrangle is not present within the range indicated by the scanning quadrangular region S101, and thus the control unit 31 determines that another red character string-circumscribing quadrangle is not present within the range indicated by the scanning quadrangular region S101 (step S67; NO). Then, as described earlier with reference to step S68, the control unit 31 performs a setting process for storing, in the RAM, a quadrangular region K101' acquired by expanding the quadrangular region K101 1 millimeter each in the main scanning direction, the sub scanning direction, the direction opposite to the main scanning direction, and the direction opposite to the sub scanning direction, as the quadrangular region to which shade is applied (step S68).

Similarly, with respect to a quadrangular region K102 in which the character string T102 is written, the control unit 31 determines whether another red character string-circumscribing quadrangle is present within and including the boundary lines of a scanning quadrangular region S102 acquired by expanding the quadrangular region K102 100 millimeters in each of the main scanning direction, the sub scanning direction, the direction opposite to the main scanning direction, and the direction opposite to the sub scanning direction (step S67). Here, the control unit 31 determines that a quadrangular region K103, in which is written a red character string that is a part of a character string T103 and thus corresponds to a red character string-circumscribing quadrangle, is present within the range of the scanning quadrangular region S102 (step S67; YES), and therefore does not perform a process for expanding the quadrangular region K102. In other words, the location information of the quadrangular region on which the shade is applied remains the same as that stored in the RAM in step S62. Next, in step S69, the control unit 31 generates document image data to which shade has been applied, the shade being created based on the transmittance stored in the RAM as a result of the aforementioned emphasis support processing and the location information composed of origin coordinates and end coordinates (step S69). In other words, the control unit 31 is an example of a generating unit that generates image data in which a pattern image, which is an image of a predetermined pattern, is disposed within a region containing an image of red text.

If another red character string-circumscribing quadrangle is not present in the vicinity (that is, within a threshold of 100 millimeters) of the red character string-circumscribing quadrangle to which shade is applied, the single red character string-circumscribing quadrangle can be considered to be in an isolated state. Even if shade is applied to such a red character string-circumscribing quadrangle, the circumscribing quadrangle only occupies a limited region within the overall document, and thus a color-blind individual may not notice the presence thereof. Accordingly, as described above, expanding the size of such a shade quadrangular region increases the area to which the shade is applied relative to the area of the overall document image more than before the expansion, making the emphasis more apparent. Therefore, it is easier for a color-blind individual to recognize the presence of characters written in red and characters written in other colors than when there is no change in the quadrangular region to which shade is applied.

The descriptions shall now return to FIG. 4. The control unit 31 performs a process for converting the document image data on which emphasis support processing has been carried out into image data in page description language, which can be processed by the image-forming apparatus 1 (step S45). Next, the control unit 31 sends the image data and an instruction to form an image based on that image data from the communication unit 35 to the image-forming apparatus 1 (step S46). When the communication unit 15 of the image-forming apparatus 1 receives the stated image data and instruction from the information processing apparatus 3, the control unit 11 converts that image data to a bitmap and controls the image-forming unit 17 to form the image on a recording medium.

Note that if in step S41, the control unit 31 has determined that no characters written in red are present (step S41; NO), the processes of steps S42 to S44 are skipped, and the procedure advances to the image processing in step S45. Furthermore, if in step S43, the radio button R52 indicating "no" is selected and the button B53 indicating "OK" in that window is selected as a result of the user operating the operation unit 33 (step S43; NO), the control unit 31 skips the process in the aforementioned step S44, and advances to the image processing in step S45.

Modified Example

In the exemplary embodiment, the emphasis support processing is carried out by the control unit 31 of the information processing apparatus 3 executing the printer driver 322. However, the entity that performs the emphasis support processing, the program in which the procedure for the emphasis support processing is denoted, and so on are not limited thereto. The procedure for the emphasis support processing may be denoted in a program different from the printer driver 322, such as, for example, the document creation application program stored in the information processing apparatus 3, or may be denoted in a computer program stored in the image-forming apparatus 1. In the latter case, the image-forming apparatus 1 executes the emphasis support processing, and thus, for example, the emphasis support processing can be carried out on image data representing an image read by the image-reading unit 16 as well. Therefore, it is also possible, when making a photocopy, to create a copy in which it is easy for a color-blind individual to distinguish reds from other colors.

Furthermore, instead of performing the emphasis support processing by the control unit 31 of the information processing apparatus 3 executing a program, which is a piece of software, the emphasis support processing may be performed by an analog circuit, such as an ASIC (Application Specific Integrated Circuit), without being based on a program.

The red color range can be defined using an arbitrary color space aside from the RGB color space as well; in other words, as long as the red color range is a range that is difficult for color-blind individuals to distinguish from other colors, any color space may be used. For example, although the red color range initially set in the printer driver 322 is the range of colors expressed by an (R, G, B) range of (220-255, 0-55, 0-55) in the RGB color space, the range may instead be defined in the HLS color space, which expresses colors through three elements, or hue, saturation, and lightness. When using the HLS color space, the red color range may be defined as, for example, H=250-255 and 0-8, L=220-255, and S=118-153. Note that here, H=0°-360° is expressed in 8 bits, and thus H=0-255 is assumed (where when H=0°, H=0, and when H=360°, H=255). In the same manner, S=0(0%)-1 (100%) is expressed in 8 bits, and thus S=0-255 is assumed (where when S=0%, S=0, and when S=100%, S=255). Finally, L=0(0%)-1(100%) is expressed in 8 bits, and thus L=0-255 is assumed (where when L=0%, L=0, and when L=100%, L=255).

Although in the exemplary embodiment, "shade" refers to text ornamentation in which multiple halftone dot images are disposed, with predetermined spaces left therebetween, within a quadrangular region containing a quadrangle that circumscribes a character string written in red, the process for emphasizing red text is not limited thereto.

The processing for emphasizing text written in red may be any process, as long as that process disposes a pattern image, which is an image of a predetermined pattern, within regions that contain text written in red. The region, meanwhile, that contains text written in red is not limited to a quadrangular shape composed of straight lines; the shape may be composed of curved lines, such as a shape whose portions that correspond to the apexes of the quadrangle are curved. Furthermore, instead of the multiple halftone-dot images disposed with predetermined spaces left therebetween, as exemplified in the exemplary embodiment, the "predetermined pattern" may be multiple line segment images, extending in the same direction, disposed with predetermined spaces left therebetween, or may fill the quadrangular region with gird-shaped images, multiple images having predetermined patterns or forms, or the like. However, it is of course desirable for these images to express patterns that do not interfere with the reading of text.

The shade transmittance, the degree to which the region containing text written in red is expanded during such expansion, and furthermore, the aforementioned thresholds are not limited to the examples disclosed in the exemplary embodiment.

Moreover, although shade is applied to a region containing text written in red even when that region is not expanded, the region to which the shade is to be applied may be a quadrangular region that circumscribes the red character string, as in the exemplary embodiment, or a quadrangular region that is larger than the circumscribing quadrangle by a predetermined amount. In the latter case, where the region is expanded, the control unit 31 expands the region to a size greater than the quadrangular region.

Figure 11:
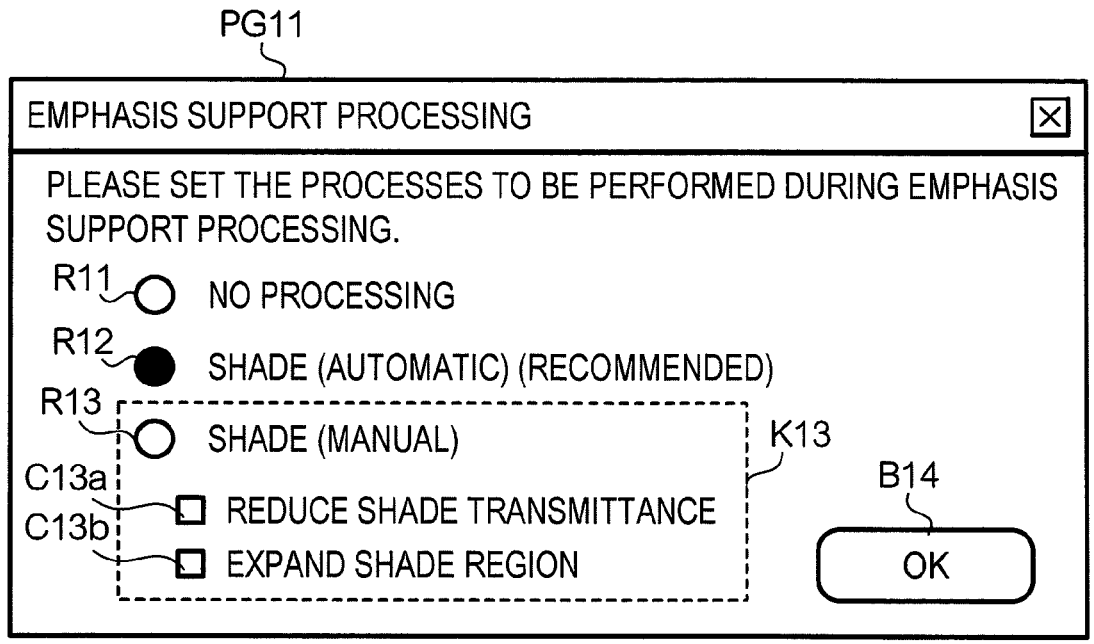
FIG. 11 is a diagram showing a window 11 for setting details of emphasis support processing.

In the exemplary embodiment, when the image of red text on which the emphasis support processing is to be performed was contained within the document image data, a process for displaying the pop-up window 5 in order to confirm whether to perform the emphasis support processing was also performed. However, whether to perform the emphasis support processing on the document image may be instructed in advance, rather than specifying whether to perform the emphasis support processing after it is discovered that the document image contains a red character string. In such a case, a window PG11 for setting the details of the emphasis support processing, as shown in FIG. 11, is displayed, and the procedure for setting the details specified through that window is denoted in the printer driver 322.

The user operates the operation unit 33, thereby instructing the window PG11 for setting the details of the emphasis support processing to be displayed; the window PG11 is one of the properties windows of the printer driver 322. Upon receiving this instruction from the user, the control unit 31 displays the window PG11 for setting the details of the emphasis support processing in the display 34. The window PG11 is provided with radio buttons R11, R12, and R13, representing alternatives for selecting the details of the emphasis support processing, and the user can select one of the radio buttons R11, R12, and R13. Here, it is assumed that the user has operated the operation unit 33, selecting the radio button R11, and then selected a button B14, "OK", on the lower-right side of the window. In this case, the control unit 31 does not carry out a process for applying shade. However, now it is assumed that the user has selected the radio button R12, and then selected the button B14. In this case, the control unit 31 performs, as the emphasis support processing, a process for applying shade of a predetermined transmittance and quadrangular region size, based on the flow showed in FIG. 6. Finally, it is assumed that the user has selected the radio button R13, checked off check boxes C13*a* and C13*b*, provided within a quadrangular region K13, that indicate the details of the processing to be performed as the emphasis support processing, and finally selected the button B14. In this case, the control unit 31 performs a process for applying shade of a predetermined transmittance and quadrangular region size, based on the details of the emphasis support processing as specified using the check boxes C13*a* and C13*b* provided within the quadrangular region K13.

Although the following three processes are included in the flowchart shown in FIG. 6 as described in the exemplary embodiment, the control unit 31 may instead perform only one of these processes, or perform a combination of two of these processes.

(Process 1)

Process 1 is a process for generating image data in which the transmittance of the pattern image is a first value in the case that the size of the region that contains the image of red text is greater than or equal to a threshold, and generating image data in which the transmittance of the pattern image is a second value that is smaller than the first value in the case that the size of the region that contains the image of red text is smaller than the threshold (steps S63, S64, S66, and S69 in FIG. 6).

Note that multiple thresholds for distinguishing the size of the region that contains an image of red text may be provided, rather than just a single threshold. When multiple thresholds are provided, multiple pattern image transmittance is also provided. This makes it possible to perform a process in which the size of the region and the transmittance are in a proportional relationship, such as, for example, the transmittance of the pattern image being reduced as the size of the region containing the image of red text decreases.

(Process 2)

Process 2 is a process for generating image data in which the area of the region containing the image of red text has been expanded to a greater size in the case that the percentage of the area of the region containing the image of red text that is occupied by the image of the red text is greater than or equal to a threshold (steps S65, S68, and S69 in FIG. 6).

(Process 3)

Process 3 is a process for generating image data in which the area of a region that contains red text and whose distance from another region exceeds a threshold is expanded to a greater size in the case that multiple regions containing an image of red text are present and the distance between those regions furthermore exceeds a threshold (steps S67, S68, and S69 in FIG. 6).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-processing apparatus comprising:
a memory that stores a red color range occurring within a color space;
an acquiring unit that acquires image data representing an image containing text; and
a generating unit that generates, based on the image data acquired by the acquiring unit, image data in which a pattern image is disposed in a region containing text whose color is within the red color range, the pattern image having a first transmittance in a case that a size of the region is greater than or equal to a threshold, the pattern image having a second transmittance that is smaller than the first transmittance in a case that the size of the region is smaller than the threshold.

2. An image-processing apparatus comprising:
a memory that stores a red color range occurring within a color space;
an acquiring unit that acquires image data representing an image containing text; and
a generating unit that generates, based on the image data acquired by the acquiring unit, image data in which a pattern image is disposed in a region containing text whose color is within the red color range, expands an area of the region in a case that a percentage of the area occupied by the red text is greater than or equal to a threshold.

3. An image-processing apparatus comprising:
a memory that stores a red color range occurring within a color space;
an acquiring unit that acquires image data representing an image containing text; and a generating unit that generates, based on the image data acquired by the acquiring unit, image data in which a pattern image is disposed in a region containing text whose color is within the red color range, expands an area of the region whose distance from another region exceeds a threshold in a case that a plurality of regions containing red text is present.

4. An image-processing apparatus comprising:
a memory that stores a red color range occurring within a color space;
an acquiring unit that acquires image data representing an image containing text; and
a generating unit that generates, based on the image data acquired by the acquiring unit, image data in which a pattern image is disposed in a region containing text whose color is within the red color range,
if a size of the region is greater than or equal to a first threshold, the pattern image occupies a first percentage of an area of the region, and in addition, expands the area in a case that a percentage of the area occupied by the red text is greater than or equal to a second threshold,
if the size of the region is smaller than the first threshold, the pattern image occupies a second percentage, which is greater than the first percentage, of the area, and in addition, expands the area in a case that a plurality of regions containing red text is present and a distance from another region exceeds a third threshold.

5. An image-forming apparatus comprising:
a memory that stores a red color range occurring within a color space;
an acquiring unit that acquires image data representing an image containing text;
a generating unit that generates, based on the image data acquired by the acquiring unit, image data in which a pattern image is disposed in a region containing text whose color is within the red color range, the pattern image having a first transmittance in a case that a size of the region is greater than or equal to a threshold, the pattern image having a second transmittance that is smaller than the first transmittance in a case that the size of the region is smaller than the threshold; and
an image forming unit that forms, on a recording medium, an image based on the image data generated by the generating unit.

6. An image-forming apparatus comprising:
a memory that stores a red color range occurring within a color space;
an acquiring unit that acquires image data representing an image containing text;
a generating unit that generates, based on the image data acquired by the acquiring unit, image data in which a pattern image is disposed in a region containing text whose color is within the red color range, expands an area of the region in a case that a percentage of the area occupied by the red text is greater than or equal to a threshold; and
an image forming unit that forms, on a recording medium, an image based on the image data generated by the generating unit.

7. An image-forming apparatus comprising:
a memory that stores a red color range occurring within a color space;
an acquiring unit that acquires image data representing an image containing text;
a generating unit that generates, based on the image data acquired by the acquiring unit, image data in which a pattern image is disposed in a region containing text whose color is within the red color range, expands an area of the region whose distance from another region exceeds a threshold in a case that a plurality of regions containing red text is present; and
an image forming unit that forms, on a recording medium, an image based on the image data generated by the generating unit.

8. An image-forming apparatus comprising:
a memory that stores a red color range occurring within a color space;
an acquiring unit that acquires image data representing an image containing text;
a generating unit that generates, based on the image data acquired by the acquiring unit, image data in which a pattern image is disposed in a region containing text whose color is within the red color range,
if a size of the region is greater than or equal to a first threshold, the pattern image occupies a first percentage of an area of the region, and in addition, expands the area in a case that a percentage of the area occupied by the red text is greater than or equal to a second threshold,
if the size of the region is smaller than the first threshold, the pattern image occupies a second percentage, which is greater than the first percentage, of the area, and in addition, expands the area in a case that a plurality of regions containing red text is present and a distance from another region exceeds a third threshold; and
an image forming unit that forms, on a recording medium, an image based on the image data generated by the generating unit.

9. An image-processing method comprising:
storing a red color range occurring within a color space;
acquiring image data representing an image containing text; and
generating, based on the image data acquired, image data in which a pattern image is disposed in a region containing text whose color is within the red color range, the pattern image having a first transmittance in a case that a size of the region is greater than or equal to a threshold, the pattern image having a second transmittance that is smaller than the first transmittance in a case that the size of the region is smaller than the threshold.

10. An image-processing method comprising:
storing a red color range occurring within a color space;
acquiring image data representing an image containing text; and
generating, based on the image data acquired, image data in which a pattern image is disposed in a region containing text whose color is within the red color range, expands an area of the region in a case that a percentage of the area occupied by the red text is greater than or equal to a threshold.

11. An image-processing method comprising:
storing a red color range occurring within a color space;
acquiring image data representing an image containing text; and
generating, based on the image data acquired, image data in which a pattern image is disposed in a region containing text whose color is within the red color range, expands an area of the region whose distance from another region exceeds a threshold in a case that a plurality of regions containing red text is present.

* * * * *